US012118886B2

(12) United States Patent
Nakano et al.

(10) Patent No.: US 12,118,886 B2
(45) Date of Patent: Oct. 15, 2024

(54) COMMUNICATION DEVICE AND COMMUNICATION METHOD

(71) Applicant: Panasonic Intellectual Property Management Co., Ltd., Osaka (JP)

(72) Inventors: Kosei Nakano, Kanagawa (JP); Hiroyuki Motozuka, Kanagawa (JP); Masataka Irie, Kanagawa (JP); Yao Huang Gaius Wee, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 105 days.

(21) Appl. No.: 17/846,785

(22) Filed: Jun. 22, 2022

(65) Prior Publication Data
US 2022/0319320 A1    Oct. 6, 2022

Related U.S. Application Data

(63) Continuation of application No. PCT/JP2020/040353, filed on Oct. 28, 2020.

(30) Foreign Application Priority Data

Dec. 25, 2019  (JP) .................. 2019-234458

(51) Int. Cl.
*G08G 1/123*  (2006.01)
*G08G 1/13*   (2006.01)
(Continued)

(52) U.S. Cl.
CPC ............... *G08G 1/13* (2013.01); *H04W 4/02* (2013.01); *H04W 4/44* (2018.02)

(58) Field of Classification Search
CPC ...... G08G 1/0112; G08G 1/0116; G08G 1/04; G08G 1/0969; G08G 1/13; H04W 4/02;
(Continued)

(56) References Cited

U.S. PATENT DOCUMENTS 8,432,297 B2 * 4/2013 Sonnabend ............ G08G 1/147
340/932.2
10,509,095 B1 * 12/2019 Kim ....................... G07C 5/008
(Continued)

FOREIGN PATENT DOCUMENTS

JP    2002-133586 A    5/2002
JP    2008-204003 A    9/2008
(Continued)

OTHER PUBLICATIONS

International Search Report, mailed Dec. 15, 2020, for International Application No. PCT/JP2020/040353, 4 pages. (with English translation).

*Primary Examiner* — Quang Pham
(74) *Attorney, Agent, or Firm* — Seed IP Law Group LLP

(57) ABSTRACT

A communication apparatus mounted on a vehicle includes: a camera that captures a still image used for generating a map; a positioning circuit that positions a captured position of the still image; a control circuit that associates position information indicating the captured position with image data of the still image; and a communication circuit that establishes a radio communication with a roadside unit and transmits the image data by radio to the roadside unit, in which the control circuit rearranges an transmission order of the image data to be transmitted by radio to the roadside unit, based on the position information.

11 Claims, 14 Drawing Sheets

(51) Int. Cl.
*H04W 4/02* (2018.01)
*H04W 4/44* (2018.01)

(58) Field of Classification Search
CPC .... H04W 4/029; H04W 4/44; G01C 21/3602; G06V 20/56; G06V 20/588; H04N 23/698
See application file for complete search history.

(56) References Cited

U.S. PATENT DOCUMENTS

| | | | | |
|---|---|---|---|---|
| 11,378,413 | B1* | 7/2022 | Rao | G01C 21/3605 |
| 2002/0194213 | A1 | 12/2002 | Takayanagi | |
| 2007/0160291 | A1* | 7/2007 | Takahashi | G06V 20/56 |
| | | | | 382/181 |
| 2010/0114478 | A1* | 5/2010 | Bai | G09B 29/102 |
| | | | | 707/E17.005 |
| 2013/0147955 | A1* | 6/2013 | Oosugi | G08G 1/096716 |
| | | | | 348/148 |
| 2014/0303966 | A1* | 10/2014 | Adachi | H04M 1/72457 |
| | | | | 704/201 |
| 2016/0069703 | A1* | 3/2016 | Nakano | G06F 16/5866 |
| | | | | 701/428 |
| 2016/0203721 | A1* | 7/2016 | Wright | G08G 1/168 |
| | | | | 348/118 |
| 2018/0314901 | A1* | 11/2018 | Suzuki | G08G 1/0133 |
| 2018/0315304 | A1* | 11/2018 | Suzuki | G06V 20/582 |
| 2019/0005310 | A1* | 1/2019 | Kim | H04N 7/181 |
| 2019/0019415 | A1* | 1/2019 | McQuade | G08G 1/20 |
| 2019/0138023 | A1* | 5/2019 | Niwa | B60W 30/165 |
| 2019/0164267 | A1* | 5/2019 | Oe | G08G 1/0133 |
| 2019/0213425 | A1* | 7/2019 | Anderson | H04W 4/44 |
| 2019/0215437 | A1* | 7/2019 | Kusanagi | H04N 7/185 |
| 2019/0302756 | A1* | 10/2019 | Mori | G05D 1/0027 |
| 2019/0376809 | A1* | 12/2019 | Hanniel | G01C 21/3602 |
| 2019/0384277 | A1* | 12/2019 | Otaka | H04W 4/48 |
| 2020/0074861 | A1* | 3/2020 | Park | G08G 1/166 |
| 2020/0076895 | A1* | 3/2020 | Tsuyunashi | H04N 21/40 |
| 2020/0125870 | A1* | 4/2020 | Nishimura | G08G 1/0129 |
| 2020/0169762 | A1* | 5/2020 | Goluguri | H04N 21/47202 |
| 2020/0175874 | A1* | 6/2020 | Sakurada | G08G 1/04 |
| 2020/0184237 | A1* | 6/2020 | Sakurada | H04W 4/38 |
| 2021/0035323 | A1* | 2/2021 | Babcock | G06T 7/73 |
| 2021/0065241 | A1* | 3/2021 | Chakravarty | G06Q 30/0261 |
| 2021/0082143 | A1* | 3/2021 | Lee | G05D 1/02 |
| 2021/0103728 | A1* | 4/2021 | Young | G06V 10/87 |
| 2021/0397181 | A1* | 12/2021 | Hwang | H04N 21/21805 |
| 2022/0028254 | A1* | 1/2022 | Ogawa | G08G 1/096716 |
| 2022/0074749 | A1* | 3/2022 | Bennett | G06V 20/62 |

FOREIGN PATENT DOCUMENTS

| | | |
|---|---|---|
| JP | 4934922 B2 | 5/2012 |
| JP | 2016-032258 A | 3/2016 |

* cited by examiner

COMMUNICATION DEVICE AND COMMUNICATION METHOD

TECHNICAL FIELD

The present disclosure relates to a communication apparatus and a communication method.

BACKGROUND ART

Patent Literature (hereinafter, referred to as "PTL") 1 discloses an information transmitting/receiving system that can receive all information by putting priority rank to the information when not all information data can be transmitted at one time due to a limitation of communication means. As a method of recognizing the priority, PLT 1 discloses, for example, a method of recognizing portions of image information having higher dot densities as more important, and a method of recognizing portions of image information having positional coordinates closer to the middle as more important.

CITATION LIST

Patent Literature

PTL 1
Japanese Patent Application Laid-Open No. 2002-133586

SUMMARY OF INVENTION

Incidentally, there is a capturing vehicle for capturing a photographic image (still image) used for generating a map while traveling. An on-board unit of the capturing vehicle captures still images around the town and stores the images in the storage unit. When the on-board unit of the capturing vehicle establishes a radio communication with, for example, a roadside unit installed on the road side while traveling, the on-board unit transmits image data stored in the storage unit to a server for generating a map through the roadside unit.

However, when the on-board unit of the capturing vehicle transmits image data of the still image stored in the storage unit to the roadside unit in the captured order and the radio communication between the on-board unit and the roadside unit is disconnected in the middle of transmitting the image data, there is a problem in that a map of a narrow area biased to a part of the area is generated.

One non-limiting and exemplary embodiment of the present disclosures facilitates providing a communication apparatus and a communication method each of which enables to generate a wide-area map even when a radio communication with a roadside unit is disconnected.

A communication apparatus according to an embodiment of the present disclosure is a communication apparatus to be mounted on a vehicle, and includes: a camera that captures a still image used for generating a map; a positioning circuit that positions a captured position of the still image; a control circuit that associates position information indicating the captured position with image data of the still image; and a communication circuit that establishes a radio communication with a roadside unit and transmits the image data by radio to the roadside unit, wherein the control circuit rearranges an transmission order of the image data to be transmitted by radio to the roadside unit, based on the position information.

A communication method for a communication apparatus according to an embodiment of the present disclosure is a communication method for a communication apparatus to be mounted on a vehicle, and includes: capturing a still image used for generating a map; positioning a captured position of the still image; associating position information indicating the captured position with image data of the still image; establishing a radio communication with a roadside unit and transmitting the image data to the roadside unit by radio; and rearranging a transmission order of the image data to be transmitted, by radio, to the roadside unit based on the position information.

It should be noted that general or specific embodiments may be implemented as a system, an apparatus, a method, an integrated circuit, a computer program, a storage medium, or any selective combination thereof.

According to an embodiment of the present disclosure, it is possible to generate a wide-area map even when a radio communication with a roadside unit is disconnected.

Additional benefits and advantages of one embodiment of the present disclosure will become apparent from the specification and drawings. The benefits and/or advantages may be individually obtained by some embodiments and features described in the specification and drawings, which need not all be provided in order to obtain one or more of such features.

DESCRIPTION OF EMBODIMENTS

Hereinafter, embodiments of the present invention will be described in detail with reference to the drawings as appropriate. However, a detailed description more than necessary may be omitted, such as a detailed description of a well-known matter and a duplicate description for a substantially identical configuration, to avoid unnecessary redundancy of the following description and to facilitate understanding by a person skilled in the art.

Note that, the accompanying drawings and the following description are provided for a person skilled in the art to sufficiently understand the present disclosure, and are not intended to limit the subject matter described in the claims.

Embodiment 1

Figure 1:
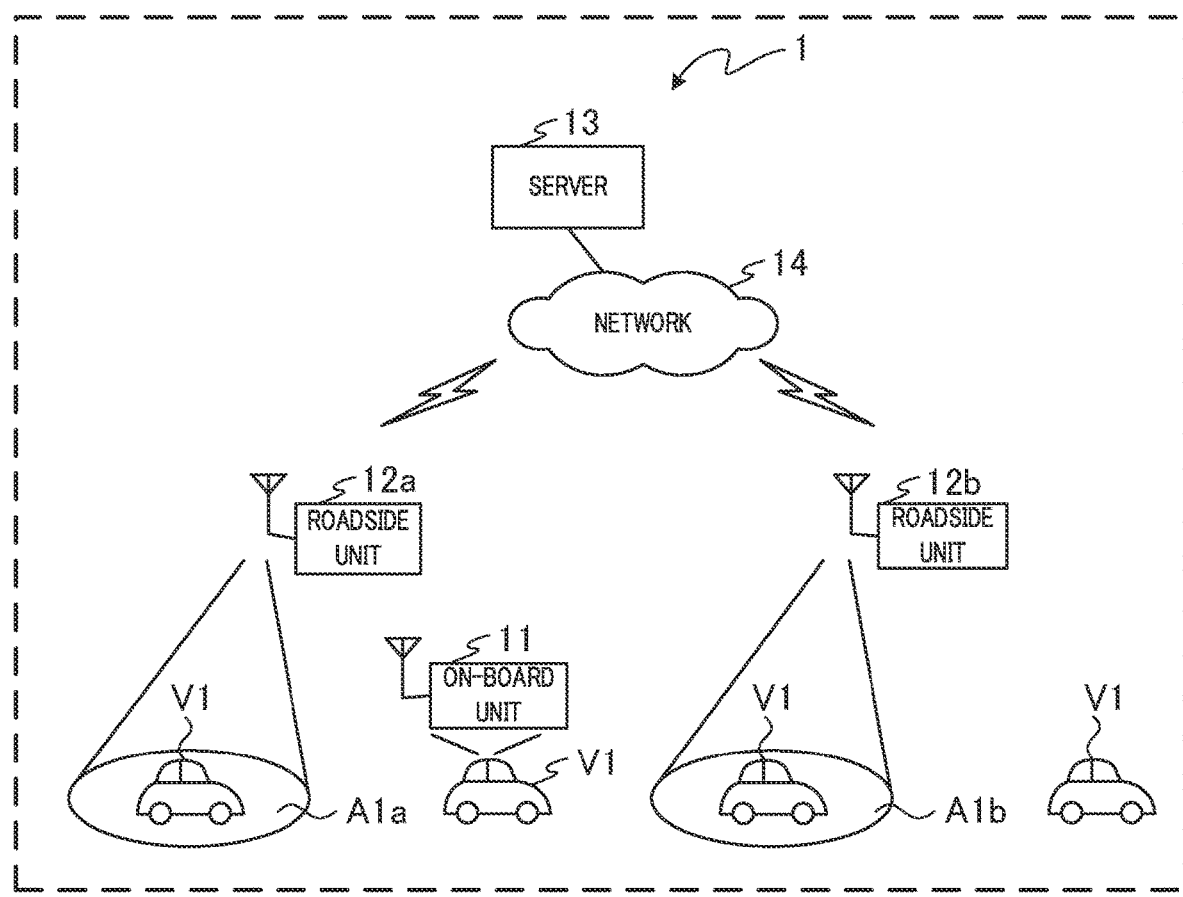
FIG. 1 is a diagram illustrating an example of a communication system according to Embodiment 1.

FIG. 1 is a diagram illustrating an example of communication system 1 according to Embodiment 1. As described in FIG. 1, communication system 1 includes on-board unit (OBU: On-Board Unit) 11, roadside units (RSU: RoadSide Unit) 12a and 12b, and server 13.

Vehicle V1 is illustrated in FIG. 1. Vehicle V1 is a capturing vehicle for capturing a still image used for generating a map. Vehicle V1 captures still images around the town while traveling, for example, an intersection, an arterial road, a highway, or the like. Vehicle V1 travels, for example, from the left side toward the right side in FIG. 1.

OBU 11 is mounted on vehicle V1. OBU 11 performs radio communication with RSUs 12a and 12b. For example, OBU 11 performs radio communication with RSU 12a in communication area A1a of RSU 12a. OBU 11 performs radio communication with RSU 12b in communication area A1b of RSU 12b.

OBU 11 performs radio communication with RSUs 12a and 12b using, for example, the millimeter-wave band. For example, OBU 11 performs radio communication with RSUs 12a and 12b based on Dedicated Short Range Communication (DSRC).

OBU 11 includes a camera and a positioning unit. The camera is, for example, an omnidirectional camera, and photographs around the town. The positioning unit is, for example, an apparatus such as a global navigation satellite system (GNSS), a global positioning system (GPS), or the like, and measures the position of OBU 11 (vehicle V1).

OBU 11 associates image data of the still image captured by the camera with the position information indicating the position of OBU 11 measured when the still image is captured, and transmits to server 13 through RSUs 12a and 12b and network 14. That is, OBU 11 associates the image data of the still image captured by the camera with the position information indicating the position where the still image is captured by the camera, and transmits to server 13.

RSUs 12a and 12b may be installed in, for example, a traffic signal, a street light, or a utility pole. RSUs 12a and 12b transmit image data (image data which the position information is associated with) transmitted from OBU 11 to server 13 through network 14.

RSUs 12a and 12b may include a storage unit capable of temporarily storing image data. In this case, RSUs 12a and 12b may temporarily store image data transmitted from OBU 11 in the storage unit and transmit the data to server 13.

Server 13 includes a storage unit such as a database and an object storage. Server 13 stores image data transmitted from RSUs 12a and 12b in the storage unit. Server 13 performs image processing, object detecting processing, and the like on image data stored in the storage unit to generate a map by still images. Server 13 may be an on-premise server or a cloud server.

Network 14 is, for example, a network including the Internet and a radio communication network such as mobile phone.

Note that one vehicle V1 and one OBU 11 are illustrated in FIG. 1, but the present invention is not limited thereto. There may be a plurality of vehicles and OBUs. Further, two RSUs of 12a and 12b are described in FIG. 1, but the present invention is not limited thereto. The number of RSUs may be one, or a plural number, such as three or more. OBU 11 may be referred to as a communication apparatus.

In addition, RSUs 12a and 12b may be connected to network 14 by radio communication or may be connected to network 14 by wired communication in FIG. 1.

Hereinafter, the transmission of image data from OBU 11 to server 13 may be referred to as uploading.

Figure 2:
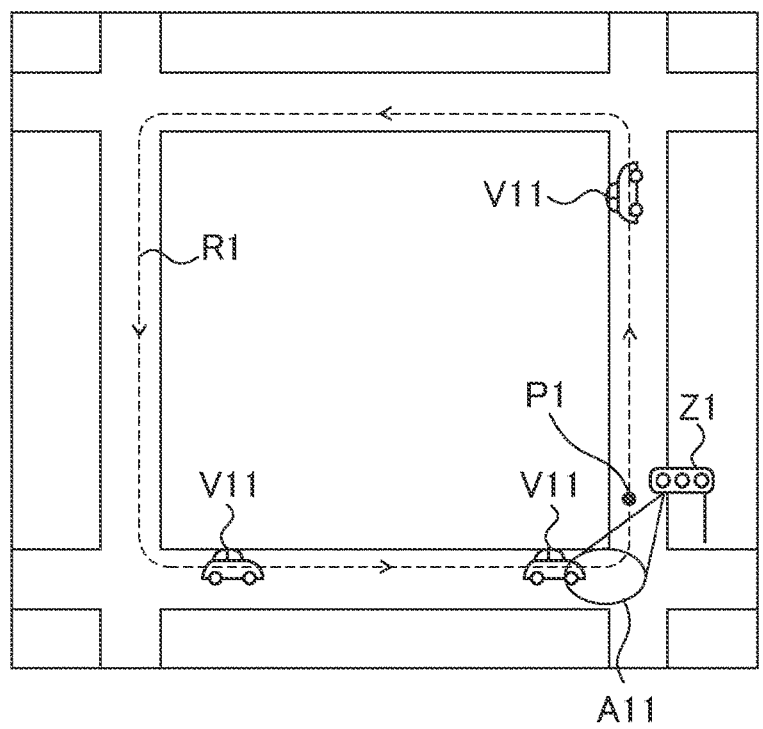
FIG. 2 is a diagram illustrating an example of uploading image data.

FIG. 2 is a diagram illustrating an example of uploading image data. FIG. 2 illustrates vehicle V11 on which an OBU is mounted, a town where vehicle V11 travels, and traffic signal Z1 on which a RSU is mounted.

Vehicle V11 travels traveling route R1 described as the dotted arrow in FIG. 2. Vehicle V11 travels a certain section of the town counterclockwise as indicated in traveling rout R1 from point P1 indicated in FIG. 2.

An OBU of vehicle V11 starts capturing a still image by the camera from point P1 indicated in FIG. 2. For example, the OBU may capture a still image each time vehicle V11 travels a certain distance. The OBU of vehicle V11 stores image data of the still image captured by the camera in the storage unit.

An RSU mounted on traffic signal Z1 forms communication area A11. The OBU of vehicle V11 performs radio communication with the RSU mounted on traffic signal Z1 in communication area A11, and uploads image data stored in the storage unit. For example, the OBU of vehicle V11 stores still images in the storage unit from point P1 until entering communication area A11 of the RSU. After entering communication area A11 of the RSU, the OBU of vehicle V11 uploads the still images stored in the storage unit.

Figure 3:
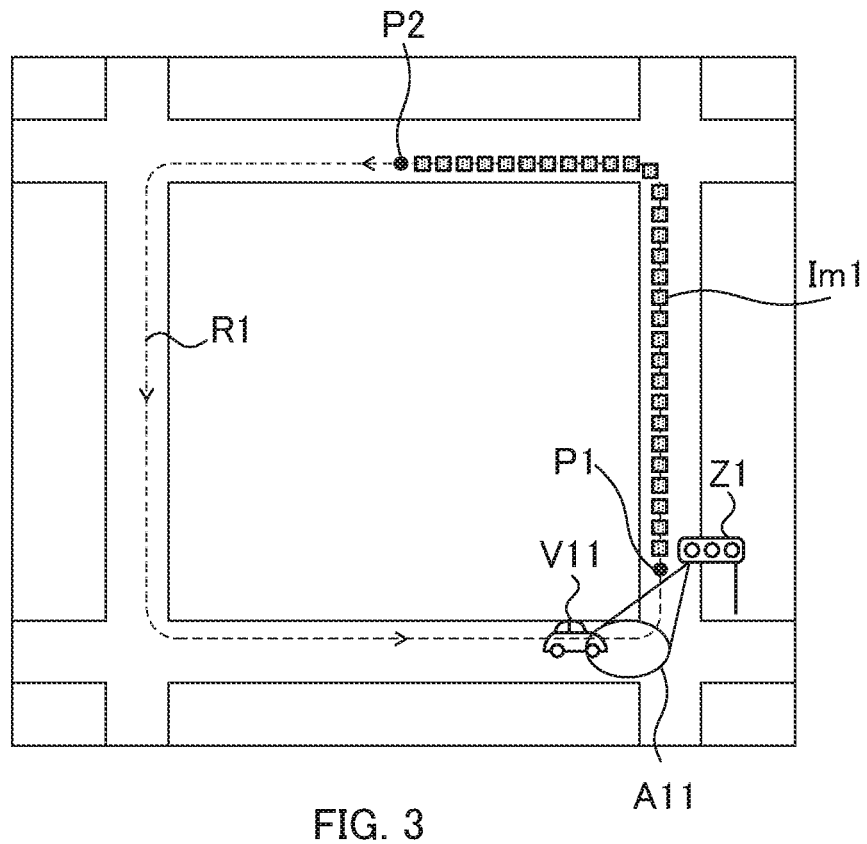
FIG. 3 is a diagram illustrating an another example of uploading image data.

FIG. 3 is a diagram illustrating an example of uploading image data. Components that are the same as those in FIG. 2 are denoted by the same reference numerals in FIG. 3. Images Im1 each indicated by the hatched square in FIG. 3 are still mages captured by the camera of the OBU of vehicle V11 and indicate uploaded still images.

The OBU of vehicle V11 uploads image data stored in the storage unit in communication area A11, as described in FIG. 2. The OBU of vehicle V11 uploads the image data stored in the storage unit, in the order the images were captured (may be referred to as a "captured order" herein).

A case will be described in which the radio communication between the OBU of vehicle V11 and the RSU mounted on traffic signal Z1 is disconnected before the completion of uploading image data of all the still images captured by the OBU of vehicle V11 from point P1 until entering communication area A11. In this case, still images uploaded to server 13 are, for example, images Im1 in FIG. 3. For example, some of the still images from point P1 indicated in FIG. 3 to point P2 indicated in FIG. 3 in traveling rout R1 are uploaded to the server.

For example, when the OBU of vehicle V11 uploads image data in a time series order (e.g., captured order), a map of a narrow area biased to a part of the area is generated for traveling route R1 in server 13. For example, when the radio communication between the OBU of vehicle V11 and the RSU is disconnected in the middle of the uploading of image data, the map from point P1 to point P2 is generated, but the map from point P2 to communication area A11 is not generated, and thus a map of a biased narrow area is generated.

Therefore, OBU 11 described in FIG. 1 uploads image data stored in the storage unit in an order different from the captured order.

Figure 4:
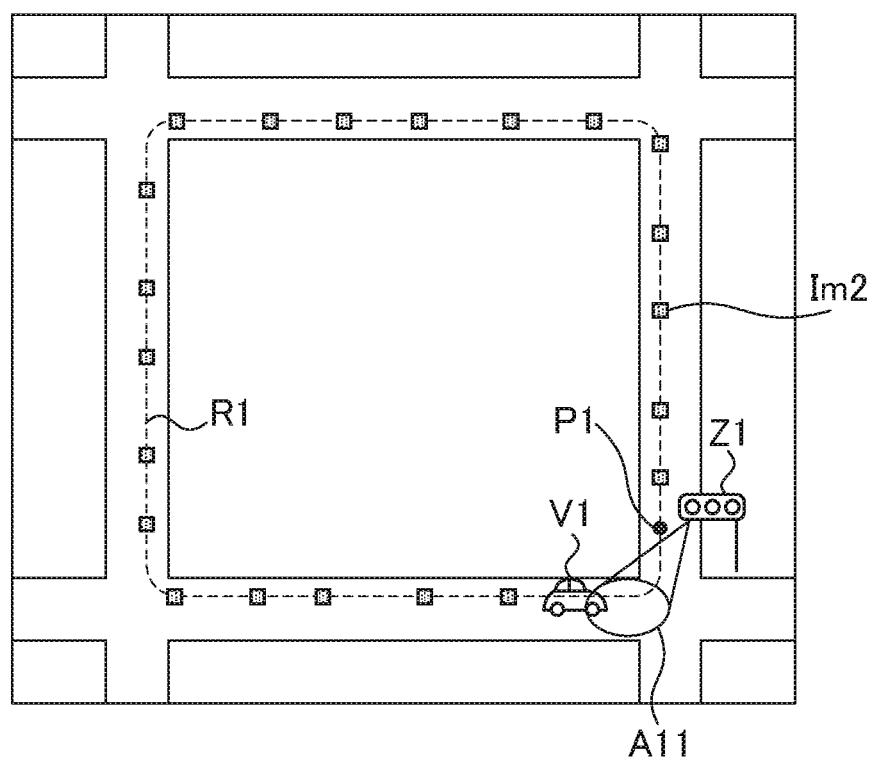
FIG. 4 is a diagram illustrating a still another example of uploading image data.

FIG. 4 is a diagram illustrating an example of uploading image data. Components that are the same as those in FIG. 2 are denoted by the same reference numerals in FIG. 4. Images Im2 each indicated by the hatched square in FIG. 4 are still images captured by the camera of the OBU of vehicle V11 described in FIG. 1, and indicate uploaded still images.

OBU 11 enters into communication area A11 of traffic signal Z1. Before uploading image data, for example, OBU 11 rearranges image data stored in the storage unit in the captured order, and uploads image data in the rearranged order. For example, OBU 11 rearranges image data such that the density of image data is higher (the distance between image data shortens) as the image data to be uploaded is widely dispersed and the data volume of the image data to be uploaded increases. That is, OBU 11 uploads image data such that image data is geographically dispersed.

As a result, when the radio communication between OBU 11 and the RSU of traffic signal Z1 is disconnected during the uploading of image data, server 13 can generate an uniform (even) wide-area map in traveling route R1. For example, as indicated in image Im2 of FIG. 4, server 13 can generate a map by still images of entire traveling route R1.

When the amount of image data to be transmitted is small, a discontinuous map is generated, but as the amount of the transmission data increases, a map with a large amount of information (the number of pieces of image data) is generated.

Further, in FIGS. 2 to 4, traveling route R1 is orbiting, but may not be orbiting.

Figure 5:
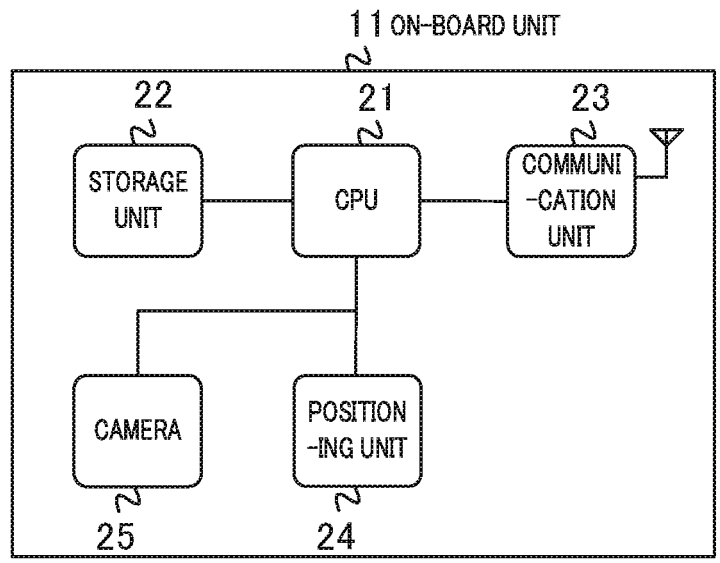
FIG. 5 is a block diagram illustrating an exemplary configuration of an on-board unit.

FIG. 5 is a block diagram illustrating an exemplary configuration of OBU 11. As described in FIG. 5, OBU 11 includes central processing unit (CPU) 21, storage unit 22, communication unit 23, positioning unit 24, and cameras 25.

CPU 21 executes a program stored in the storage unit 22 and exhibits a predetermined function. CPU 21 controls each part of OBU 11. CPU 21 may be referred to as a controller.

Storage unit 22 stores a program for operating CPU 21. Storage unit 22 stores data for CPU 21 to perform a calculation process, data for CPU 21 to control each unit, or the like. For example, storage unit 22 stores image data of still images captured by a camera in the captured order. Storage unit 22 may be configured by a storage unit such as a Random Access Memory (RAM), a Read Only Memory (ROM), a flash memory, and a Hard Disk Drive (HDD).

Communication unit 23 performs, for example, two-way radio communication with RSUs 12a and 12b based on DSRC.

Positioning unit 24 measures the position of OBU 11 (vehicle V1). For example, positioning unit 24 measures the longitude and latitude of OBU 11. Positioning unit 24 measures the position of OBU 11 by, for example, Global Navigation Satellite System (GNSS) such as Global Positioning System (GPS).

Cameras 25 may be provided, for example, on the roof of vehicle V1 or the bumper. Camera 25 is, for example, an omnidirectional camera, and photographs around the city.

Figure 6:
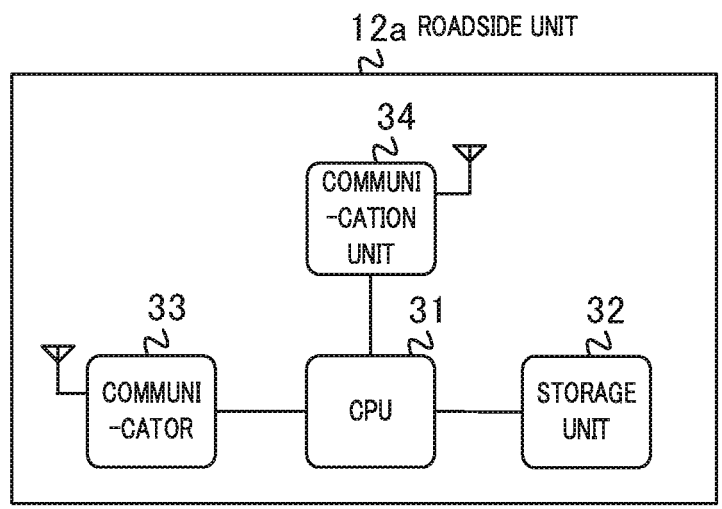
FIG. 6 is a block diagram illustrating an exemplary configuration of a roadside unit.

FIG. 6 is a block diagram illustrating an exemplary configuration of an RSU. As described in FIG. 6, RSU 12a includes CPU 31, storage unit 32, and communication units 33 and 34.

CPU 31 executes a program stored in the storage unit 32 and exhibits a predetermined function. CPU 31 controls each part of RSU 12a. CPU 31 may be referred to as a controller.

Storage unit 32 stores a program for operating CPU 31. Storage unit 32 stores data for CPU 31 to perform a calculation process, data for CPU 31 to control each unit, or the like. Storage unit 32 may be configured by a storage unit such as a RAM, a ROM, a flash memory, and an HDD.

Communication unit 33 performs, for example, two-way radio communication with OBU 11 based on DSRC.

Communication unit 34 communicates with server 13 through network 14. Communication unit 34 may be connected to network 14 by radio communication or may be connected to network 14 by wired communication.

Note that RSU 12b also includes the same block configuration as the block configuration of RSU 12a.

Figure 7:
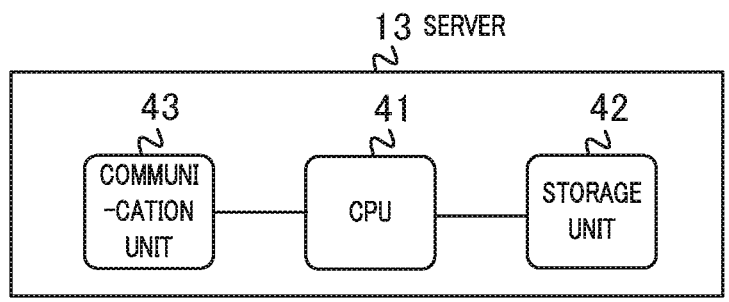
FIG. 7 is a block diagram illustrating an exemplary configuration of a server.

FIG. 7 is a block diagram illustrating an exemplary configuration of server 13. As described in FIG. 7, server 13 includes CPU 41, storage unit 42, and communication unit 43.

CPU 41 executes a program stored in the storage unit 42 and exhibits a predetermined function. CPU 41 controls each part of server 13. CPU 41 may be referred to as a controller.

Storage unit 42 stores a program for operating CPU 41. Storage unit 42 stores data for CPU 41 to perform a calculation process, data for CPU 41 to control each unit, and the like. Storage unit 42 may be configured by a storage unit such as a RAM, a ROM, a flash memory, and an HDD. Storage unit 42 may be an object storage.

Figure 8:
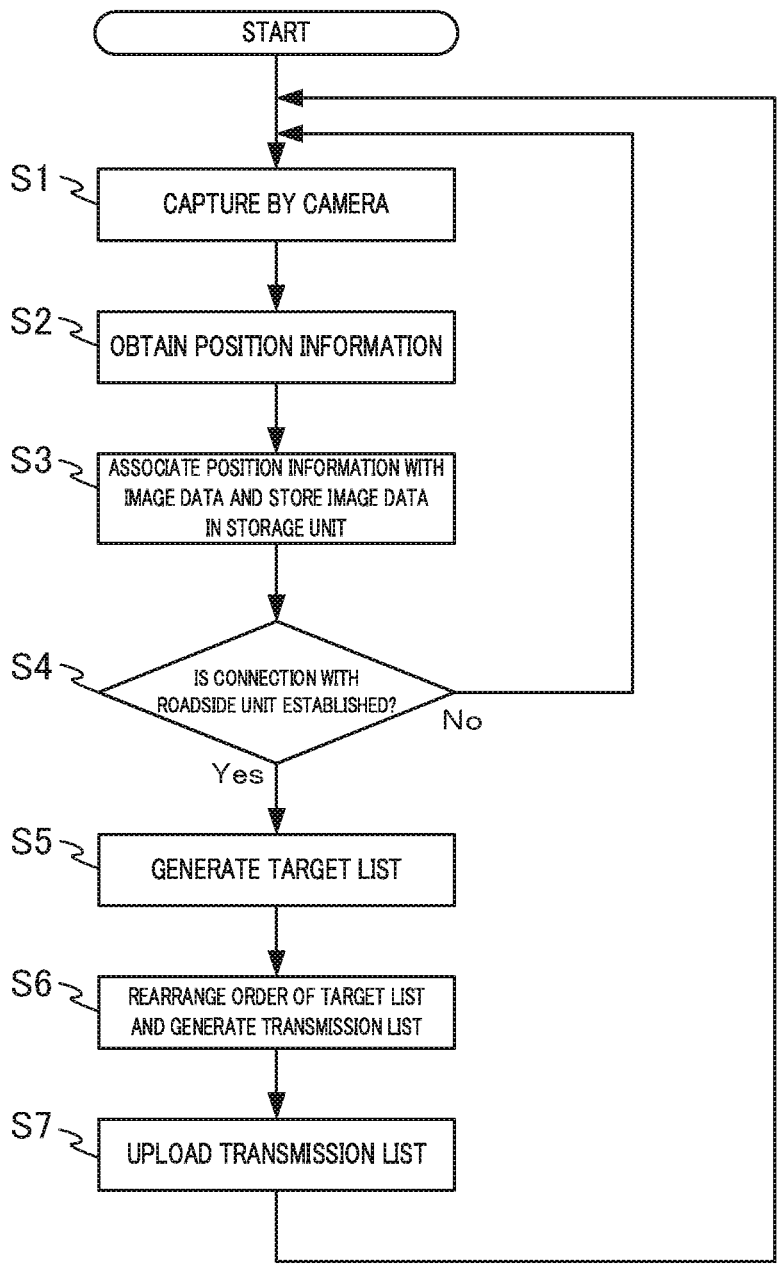
FIG. 8 is a flowchart of an exemplary operation of an on-board unit.

Communication unit 43 communicates with RSUs 12a and 12b through network 14. Communication unit 43 may be connected to network 14 by radio communication or may be connected to network 14 by wired communication FIG. 8 is a flowchart of an exemplary operation of OBU 11. Vehicle V1 equipped with OBU 11 travels around the town.

CPU 21 controls camera 25 to capture a still image (S1).

CPU 21 obtains position information of OBU 11 from positioning unit 24 (S2). That is, CPU 21 obtains a captured position of the still image captured in S1 from positioning unit 24.

CPU 21 associates the position information obtained in S2 with the image data of the still image captured in S1 and stores the image data in storage unit 22 (S3). CPU 21 stores image data in storage unit 22 in a time series order, that is, in the order the still images were captured (in the captured order).

CPU 21 controls communication unit 23 to determine whether a connection with RSUs 12a and/or 12b has been established. When CPU 21 determines that a connection with RSUs 12a and/or 12b has not been established ("No" in S4), CPU 21 shifts the processing to S1.

On the other hand, when CPU 21 determines that a connection with RSUs 12a and/or 12b has been established ("YES" in S4), CPU 21 obtains image data to be uploaded from storage unit 22 to server 13, and generates a target list (S5).

Note that image data of the target list generated in S5 is arranged in the captured order. For example, image data of target list is arranged so as to be newer from the head toward the end of the target list. More specifically, image data at the head of the target list is image data most previously captured in the target list, and image data at the end of the target list is image data most newly captured in the target list.

CPU 21 rearranges the order of image data of the target list generated in S5, and generate a transmission list (S6). Rearrangement of image data will be describe in detail with reference to FIGS. 9A and 9B.

CPU 21 uploads the transmission list generated in S6 to server 13 (S7).

CPU 21 uploads image data to server 13 from the head of the transmission list in the uploading of S7. That is, CPU 21 uploads image data of the still image to server 13 in an order different from the captured order.

Note that CPU 21 may not execute the process of obtaining the position information of S2 each time after capturing in S1. For example, CPU 21 may obtain position information after capturing a fixed number of times. In this case, CPU 21 may calculate the position information of image data whose position information has not been obtained using linear interpolation.

Further, in the associating process of S3, CPU 21 may assign the position information to image data as metadata.

CPU 21 may also generate a target list of image data at a predetermined time or area in the generation of the target list in S5. The predetermined time or area may be specified by server 13.

Further, in the uploading of the transmission list in S7, CPU 21 may upload image data by concatenating image data of a plurality of still images or by arranging image data of the plurality of still images in parallel. In addition, CPU 21 may compress and upload image data of the plurality of still images in the uploading of the transmission list of S7. CPU 21 may upload image data by concatenating a plurality of the compressed image data or by arranging the plurality of the compressed image data in parallel in the uploading of the transmission list of S7.

Further, when not all image data of the transmission list is transmitted in the upload process of the transmission list of S7, CPU 21 may discard image data that is not transmitted, or may upload the remaining image data in the next upload process.

Moreover, a transmission list may also be referred to as a transmission file. In addition, S4 may be shifted to the subsequent step of S5 and S6.

Figure 9A:
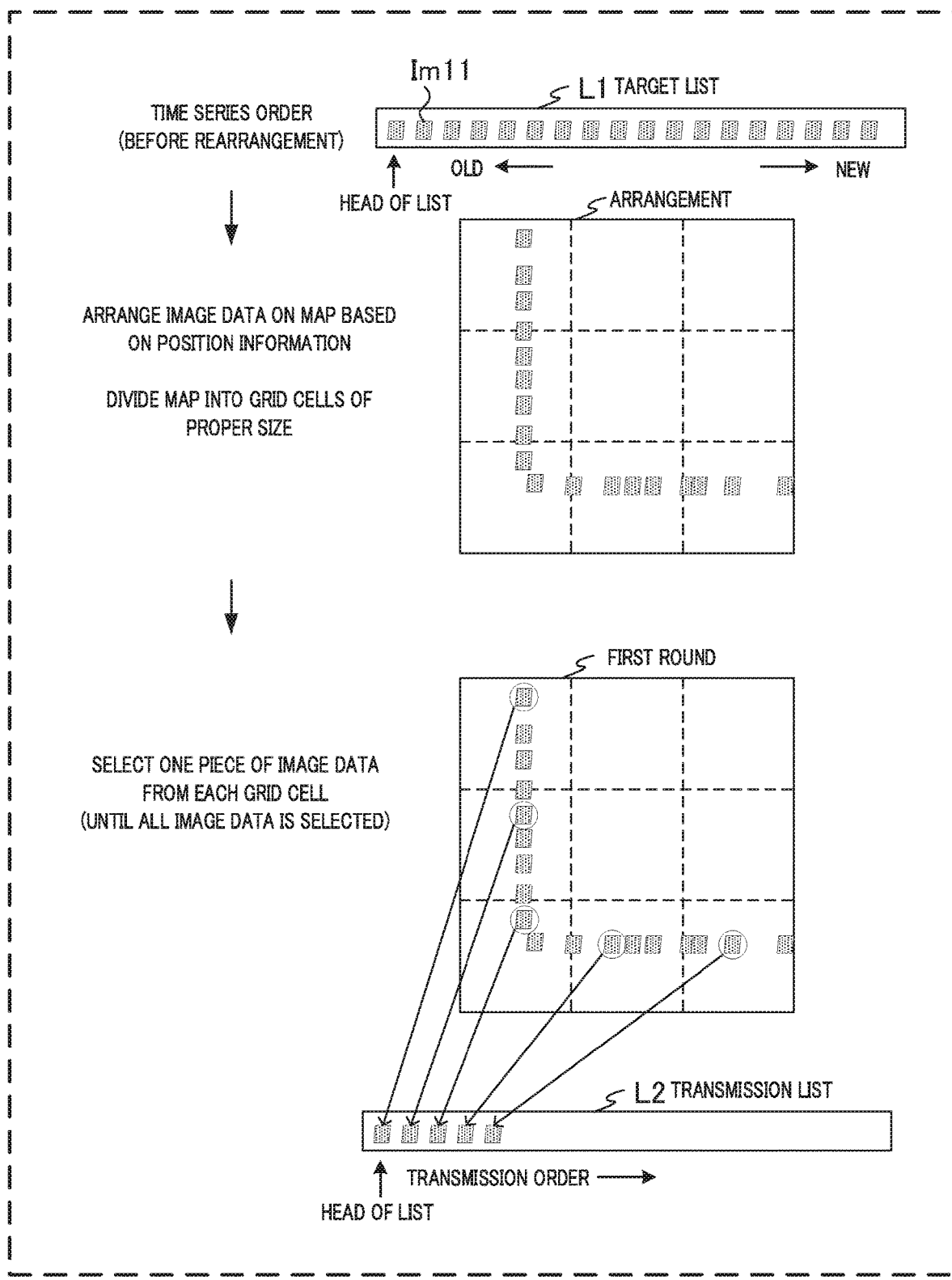
FIG. 9A is a diagram illustrating an example of rearranging image data.
Figure 9B:
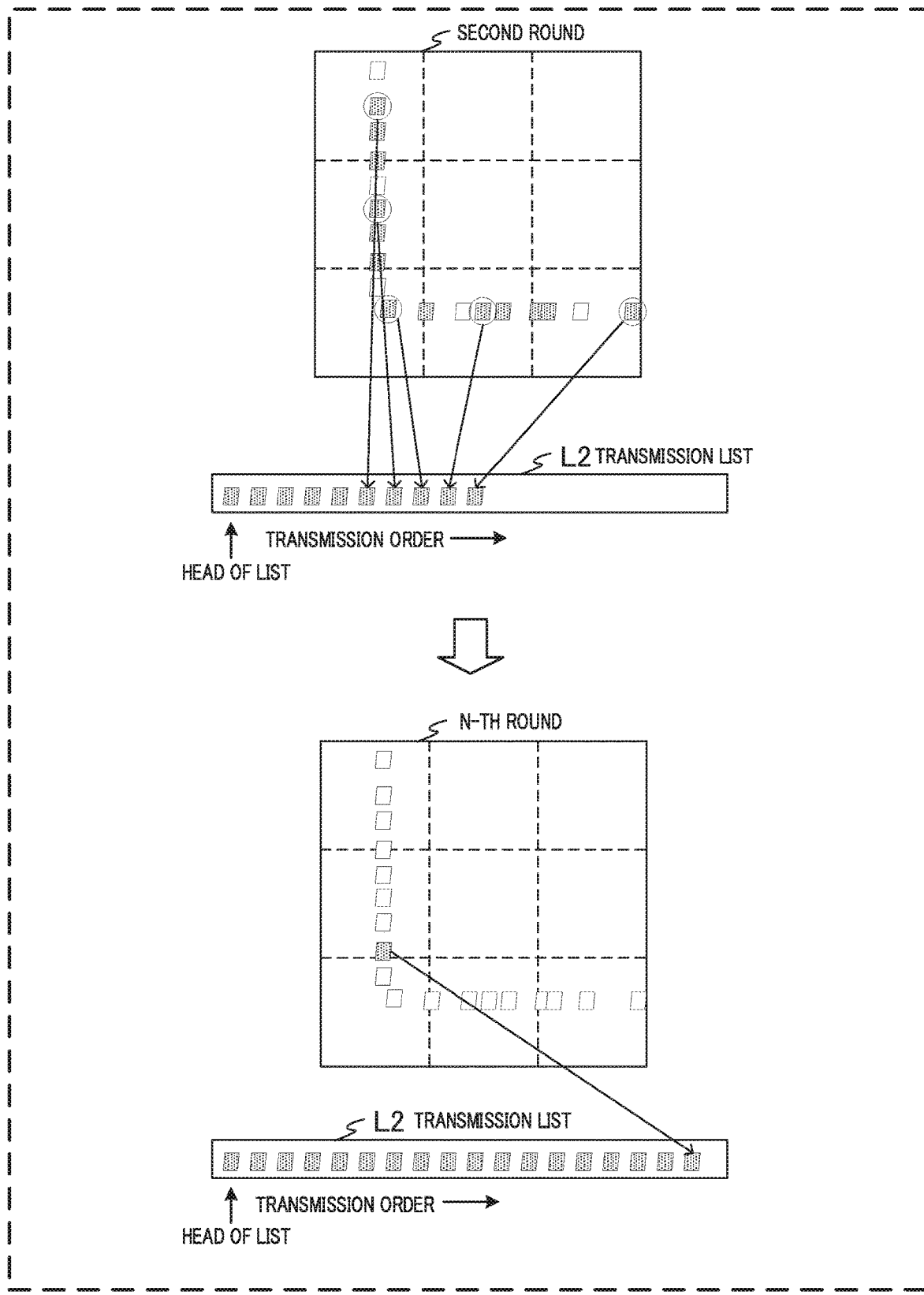
FIG. 9B is a diagram illustrating an another example of rearranging image data.

FIGS. 9A and 9B are diagrams illustrating examples of rearranging image data. Images Im11 each indicated by the hatched square in FIGS. 9A and 9B are still images captured by camera 25 of OBU 11.

FIG. 9A illustrates target list L1 described in S5 of FIG. 8. Still images (image data) are arranged in the captured order in target list L1.

After generating target list L1, CPU 21 rearranges image data in target list L1 based on the position information associated with the image data.

For example, CPU 21 arranges image data on the map (for example, on two-dimensional map data having longitude and latitude as axes) based on the position information associated with the image data as described in "arrangement" in FIG. 9A. After arranging image data on the map, CPU 21 divides the map into predetermined-sized squares or cells of a grid (hereinafter, each square or cell of the grid is referred to as a "grid cell") as indicated by the dotted lines in "arrangement" in FIG. 9A.

After dividing the map into grid cells, CPU 21 selects one image data from each grid cell (when there is no image data in the grid cell, no image data is selected) and adds the data to transmission list L2 as described in "first round" in FIG. 9A. CPU 21 adds the selected image data in order from the head of transmission list L2. CPU 21 deletes image data added to transmission list L2 from the map. Note that the deleted image data is indicated as an open square in FIG. 9B.

CPU 21 repeats the process of selecting image data from each grid cell and adding the data to transmission list L2. For example, as indicated in "second round" in FIG. 9B, CPU 21 selects image data from image data remaining in each grid cell and adds the data to transmission list L2.

CPU 21 repeats the above process until all image data arranged on the map is selected. For example, as indicated in "Nth round" in FIG. 9B, CPU 21 repeats the adding process of image data to transmission list L2 until all image data on the map is selected.

By the above process, image data of transmission list L2 in "Nth round" is arranged in an order different from the order of image data in target list L1 (image data arranged in the captured order).

After generating transmission list L2, CPU 21 uploads image data in transmission list L2 to server 13. CPU 21 uploads image data to server 13 from the head of transmission list L2.

Thus, for example, communication system 1 (server 13) can generate a map based on the positionally-widely dispersed still images when the communication between OBU 11 and RSUs 12a and 12b is disconnected during the uploading of transmission list L2. Also, communication system 1 can generate a map based on the positionally-widely dispersed still images even when traveling route R1 is positionally biased.

Note that CPU 21 may finish the rearrangement process of image data according to the processing time without finishing selecting all image data arranged on the map. Further, CPU 21 may finish the rearrangement process of image data without finishing selecting all image data arranged on the map when a predetermined amount of image data is added to transmission list L2. In other words, CPU 21 may finish the rearrangement process of image data when the amount of image data that can generate a map in server 13 are added to transmission list L2.

Figure 10A:
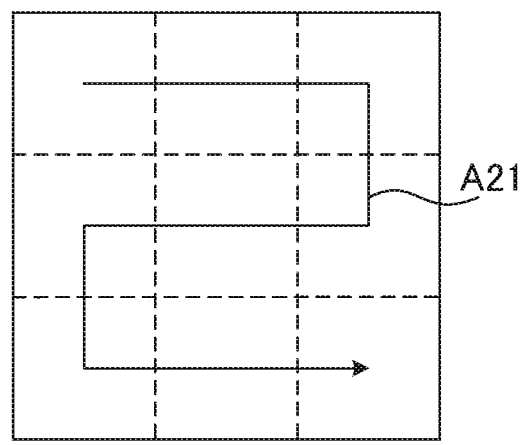
FIG. 10A is a diagram illustrating an exemplary grid cell selection.
Figure 10B:
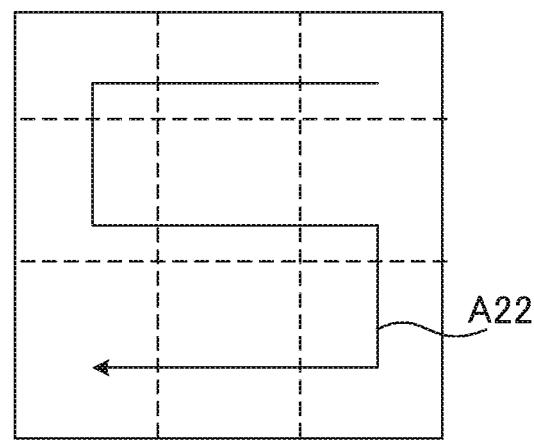
FIG. 10B is a diagram illustrating an another exemplary grid cell selection.
Figure 10C:
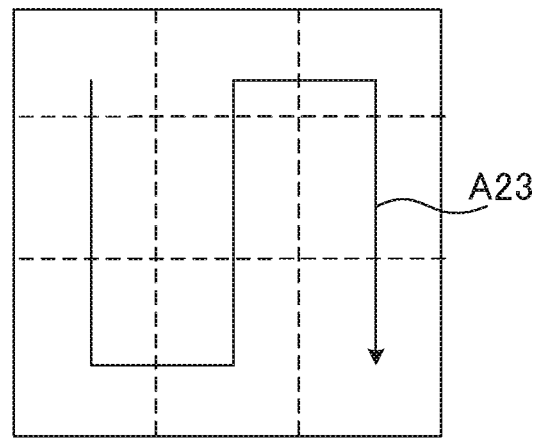
FIG. 10C is a diagram illustrating a still another exemplary grid cell selection.

FIGS. 10A, 10B, and 10C are diagrams illustrating exemplary grid cell selections. As described above, CPU 21 selects one piece of image data from each grid cell after dividing the map into grid cells.

At this time, CPU 21 may, for example, select a grid cell in order as sweeping in the horizontal direction as indicated by arrow A21 in FIG. 10A, and select one piece of image data included in each selected grid cell to add the transmission list. After selecting one piece of image data in the grid cell at the end of arrow A21 in FIG. 10A, CPU 21, for example, returns to the grid cell at the beginning of arrow A21 in FIG. 10A and select one piece of image data.

Alternatively, CPU 21 may, for example, select grid cells in order as sweeping in the horizontal direction as indicated by arrow A22 in FIG. 10B, and select one piece of image data included in each selected grid cell to add the transmission list. After selecting one piece of image data in the grid cell at the end of arrow A22 in FIG. 10B, CPU 21, for example, returns to the grid cell at the beginning of arrow A22 in FIG. 10B and select one piece of image data.

Alternatively, CPU 21 may, for example, select grid cells in order as sweeping in the vertical direction as indicated by arrow A23 in FIG. 10C, and select one piece of image data included in each selected grid cell to add the transmission list. After selecting one piece of image data in the grid cell at the end of arrow A23 in FIG. 10C, CPU 21, for example, returns to the grid cell at the beginning of arrow A23 in FIG. 10C and select one piece of image data.

The selection of grid cells is not limited to the examples of FIGS. 10A, 10B, and 10C. Grid cells may be selected as sweeping diagonally, for example, or may be randomly selected. The selection of grid cells may be performed along traveling route R1 or not along traveling route R1.

Also, CPU 21 may randomly select one piece of image data from the selected grid cell. In addition, CPU 21 may select one piece of image data from the selected grid cell according to a predetermined rule.

Figure 11:
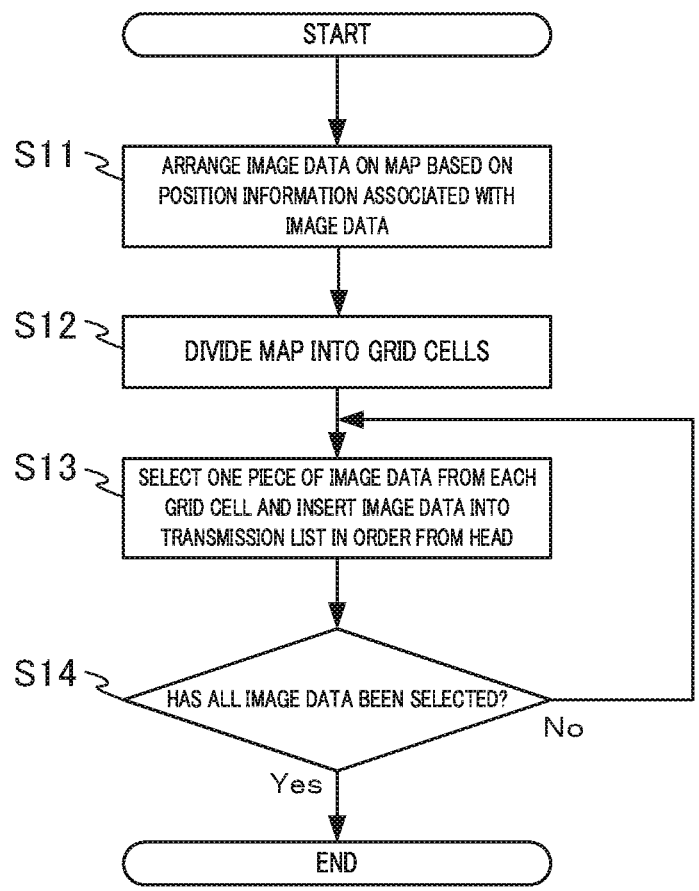
FIG. 11 is a flowchart of an exemplary rearrangement process of image data.

FIG. 11 is a flowchart of an exemplary rearrangement process of image data. The process of the flowchart in FIG. 11 corresponds to the process of S6 in FIG. 8.

CPU 21 arranges image data on the map based on the position information associated with the image data (S11).

CPU 21 divides the map into predetermined-sized grid cells (S12).

CPU 21 selects one piece of image data from each grid cell divided in S12, and inserts the image data into a transmission list in order from the head of the transmission list (S13).

CPU 21 determines whether all image data arranged on the map has been selected (S14). That is, CPU 21 determines whether all image data arranged on the map has been added to the transmission list.

When all image data arranged on the map has been selected ("YES" in S14), CPU 21 finishes the rearrangement process of image data. Note that, after finishing the rearrangement process of image data, CPU 21 uploads image data to server 13 in order from the head of the transmission list.

On the other hand, when not all image data arranged on the map has been selected ("No" in S14), CPU 21 shifts the processing to S13. That is, CPU 21 shifts the processing from the selection process of image data in the k-th round (k=1, 2, . . . , N−1) to the selection process of image data in the k+1-th round. Note that, a plurality of images may be selected, or the number of images may be different in each grid cell in S13.

As described above, OBU 11 includes camera 25 for capturing a still image, positioning unit 24 for positioning the captured position of the still image, CPU 21 for associating the position information of the captured position with image data of the still image, and communication unit 23 for establishing radio communication with RSUs 12a and/or 12b to transmit image data by radio; and CPU 21 rearranges the transmission order of image data transmitted by radio to RSUs 12a and/or 12b in an order different from the captured order of the still image based on the position information. This allows server 13 to generate a wide-area map when communication between OBU 11 and RSUs 12a and 12b is disconnected during the uploading of image data.

Further, CPU 21 arranges image data on the map based on the position information, divides the map into grid cells, selects the grid cells one by one according to a predetermined rule, selects one piece of image data from each selected grid cell, and adds the selected data in order from the head of a transmission list. Communication unit 23 transmits the image data by radio to RSUs 12a and/or 12b from the head of the transmission list. This allows server 13 to generate a wide-area map when communication between OBU 11 and RSUs 12a and 12b is disconnected during the uploading of image data.

(Variation 1)

In the above description, a size of the grid cell is constant in each round of the selection process of image data, but the size of the grid cell is not limited thereto. In the selection of image data, CPU 21 may change the size of the grid cell as the selection process of image data progresses to the selection progress of image data in the first round, the selection process of image data in the second round, . . . , and the selection process of image data in the N-th round.

Figure 12A:
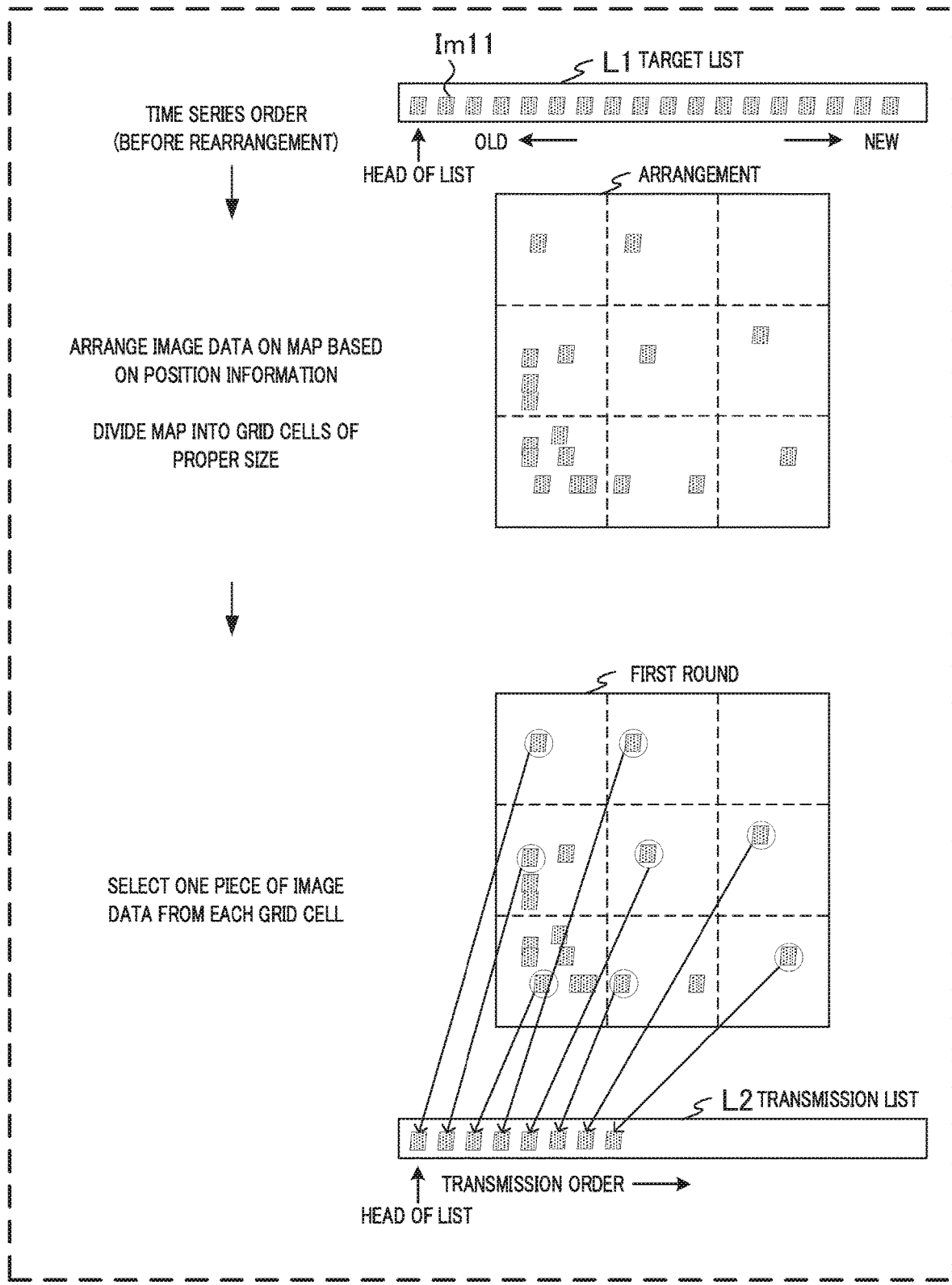
FIG. 12A is a diagram illustrating an example of rearranging image data.
Figure 12B:
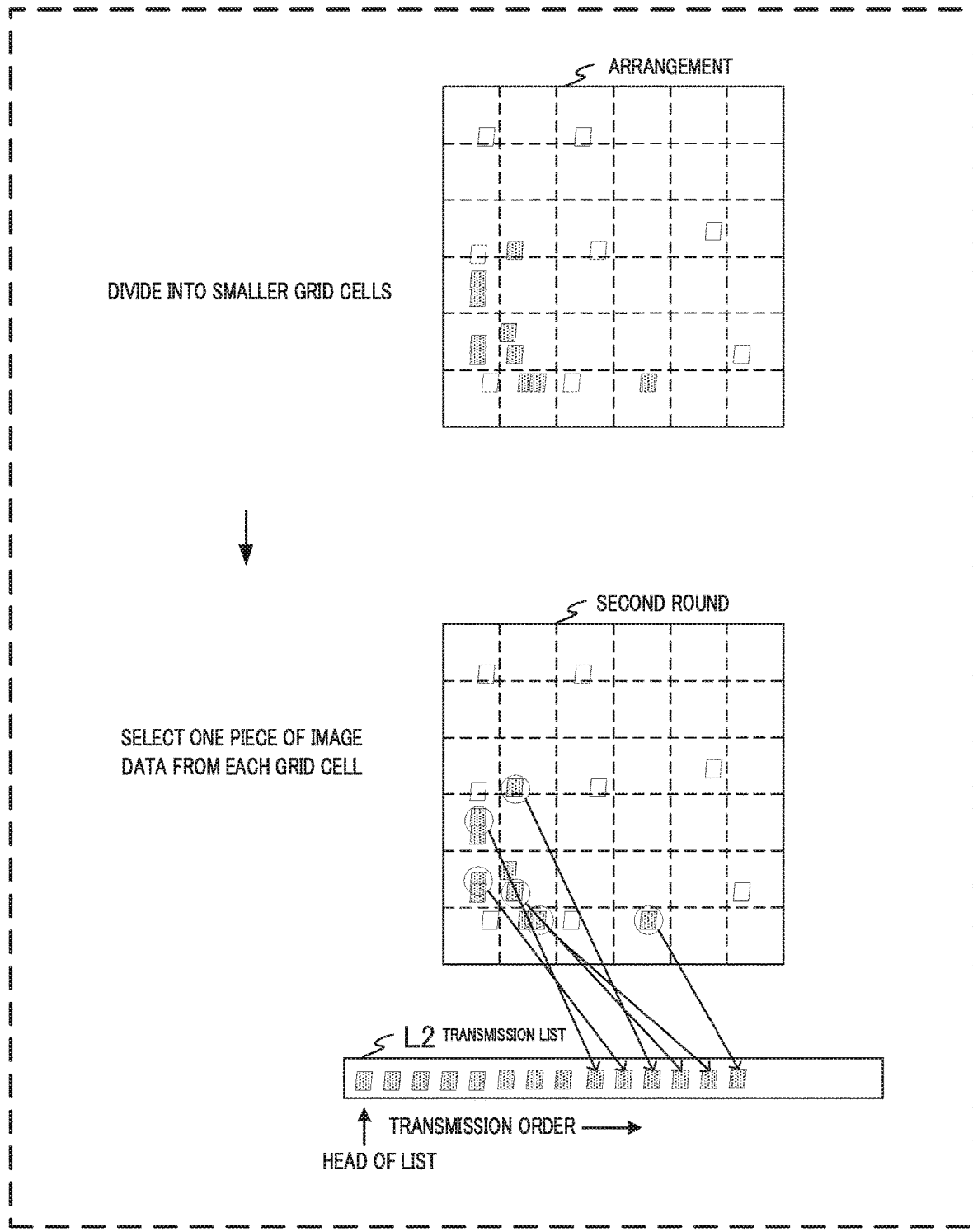
FIG. 12B is a diagram illustrating an another example of rearranging image data.

FIGS. 12A and 12B are diagrams illustrating examples of rearranging image data. Elements that are the same as those in FIGS. 9A and 9B are denoted by the same reference numerals in FIGS. 12A and 12B.

FIG. 12A illustrate target list L1 described in S5 in FIG. 8. Still images (image data) are arranged in the captured order in target list L1.

After generating target list L1, CPU 21 rearranges image data of target list L1 based on the position information associated with the image data.

For example, CPU 21 arranges image data on the map as described in "arrangement" in FIG. 12A based on the position information associated with the image data. After arranging image data on the map, CPU 21 divides the map into predetermined-sized grid cells as indicated by the dotted lines in "arrangement" in FIG. 12A.

After dividing the map into the grid cells, CPU 21 selects one piece of image data from each grid cell (when there is no image data in the grid cell, no image data is selected) and adds the data to transmission list L2 as described in "first round" in FIG. 9A. CPU 21 adds the selected image data in order from the head of transmission list L2. CPU 21 deletes image data added to transmission list L2 from the map. Note that, in the example of FIG. 12A, CPU 21 selects grid cells according to the order described in FIG. 10C.

After processing the selection of image data in "first round", CPU 21 makes the grid cells on the map smaller. For example, as indicated in "arrangement" in FIG. 12B, the grid cells on the map are made smaller than the grid cells of "first round".

CPU 21 repeats the process of selecting image data from each grid cell and adding the data to transmission list L2. For example, as indicated in "second round" in FIG. 12B, CPU 21 selects image data from image data remaining in the grid cell smaller than the grid cell of "first round" and adds the image data to transmission list L2.

After processing the selection of image data in "second round", CPU 21 makes the grid cells on the map smaller than the grid cells of "second round" (not shown). CPU 21 repeats the above process until no image data exists on the map.

As described above, after selecting all of the grid cells in the first round (e.g., in the k-th round (k=1, 2, . . . , N−1)), CPU 21 may make the size of the grid cells in the second round (e.g., in the k+1-th round) smaller than the size of the grid cells in the first round. That is, CPU 21 may make the size of the grid cells on the map smaller after processing the selection of image data in each round. Thus, for example, even when image data is concentrated in a certain area, server 13 can generate a map based on geographically dispersed still images.

Note that, in the rearrangement process in FIGS. 12A and 12B, CPU 21 shifts the processing to S12 when determining "No" in S14 of the flowchart in FIG. 11. When shifting the processing from S14 to S12, CPU 21 divides the map into grid cells smaller than the previous round in S12. Note that the size of the grid cells has been described as the same size in each round, but the size of the grid cells may be changed depending on the number of pieces of image data. The size of the grid cells may be also changed depending on the building on the map. For example, grid cells may be smaller at an intersection to increase the amount of image data.
(Variation 2)

In the above description, OBU 11 uploads image data captured by camera 25 to server 13, but the present disclosure is not limited thereto. OBU 11 may rearrange data other than the image data and upload the data to server 13.

For example, OBU 11 may include at least one of a radar, a Light Detection and Ranging (LiDAR), a sonar, an ultrasonic sensor, and/or an Electronic Control Unit (ECU). CPU 21 may associate the data outputted from those devices with the position information, rearrange the data by the same method as image data, and transmit to RSUs 12a and/or 12b.
(Variation 3)

OBU 11 may be divided into a transmission unit and a capturing unit. For example, the transmission unit may include CPU 21 and communication unit 23 described in FIG. 3.

The capturing unit may include storage unit 22, positioning unit 22, and camera 25.

As a result, a module such as a general camera or a positioning unit can be used as the capturing unit. In addition, the capturing unit can photograph around the city in parallel with the transmission process of image data by the transmission unit.

Embodiment 2

In Embodiment 2, CPU 21 of OBU 11 arranges image data on the route (on the distance axis) based on the position information. CPU 21 divides the route into grid cells, selects one piece of image data from each grid cell, and rearrange image data. In the following, portions different from those of Embodiment 1 will be described.

Figure 13:
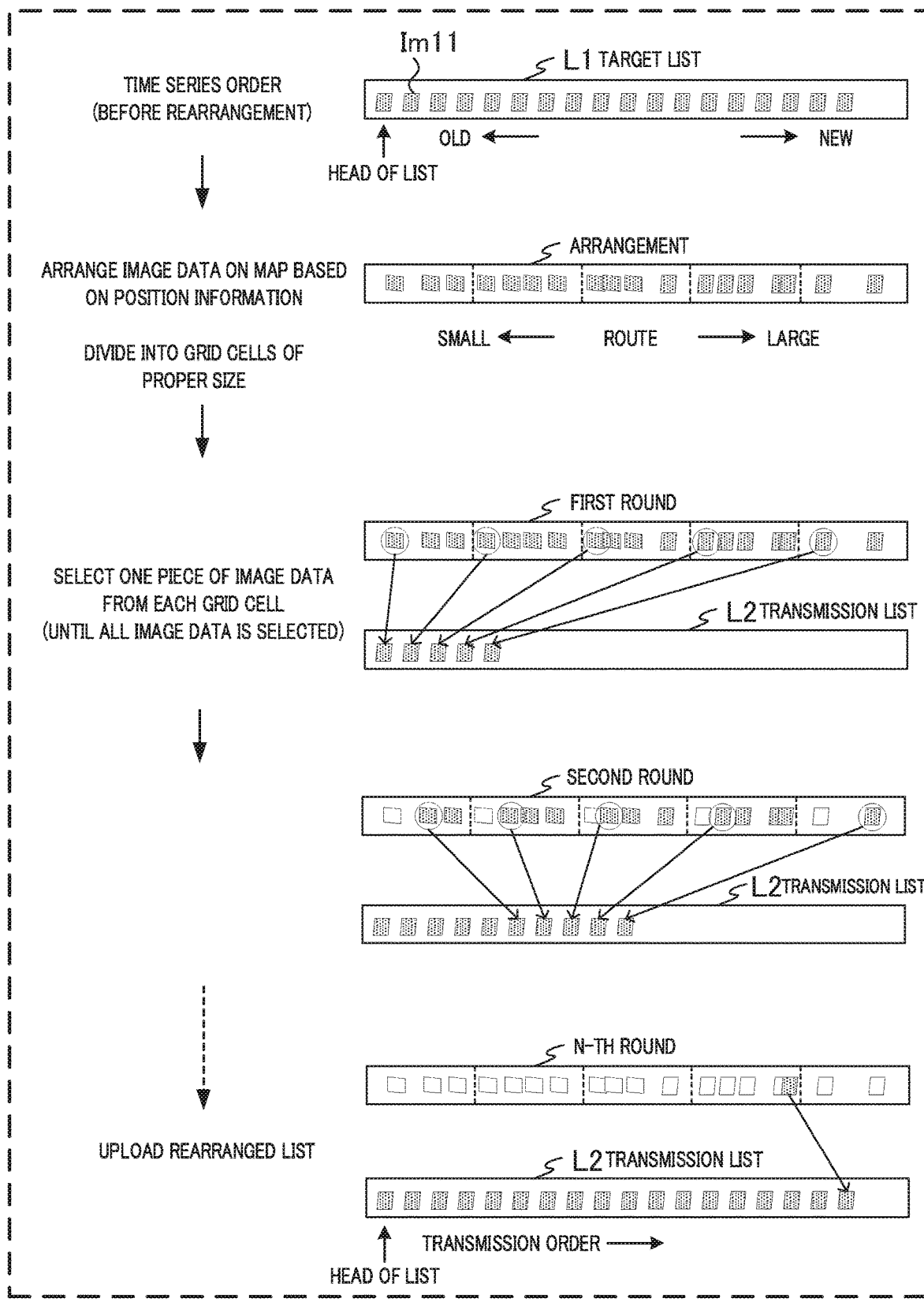
FIG. 13 is a diagram illustrating an example of rearranging image data according to Embodiment 2.

FIG. 13 is a diagram illustrating an example of rearranging image data according to Embodiment 2. Elements that are the same as those in FIGS. 9A and 9B are denoted by the same reference numerals in FIG. 13.

FIG. 13 illustrates target list L1 described in S5 in FIG. 8. Still images (image data) are arranged in the captured order.

After generating target list L1, CPU 21 rearranges image data of target list L1 based on the position information associated with the image data.

For example, CPU 21 arranges image data on the route (e.g., on the distance axis with the position where a still image is initially captured as the origin) based on the position information associated with image data as indicated in "arrangement" in FIG. 13. After arranging image data on the route, CPU 21 divides the route into predetermined-sized grid cells as indicated by the dotted line in "arrangement" in FIG. 13.

After dividing the route into the grid cells, CPU 21 selects one piece of image data from each grid cell (when there is no image data in the grid cell, no image data is selected) and adds the image data to transmission list L2 as indicated in "first round" in FIG. 13. CPU 21 selects grid cells for selecting image data, for example, in order from smaller (start) to larger (end) in the route. CPU 21 adds the selected image data in order from the head of transmission list L2. CPU 21 deletes image data added to transmission list L2 from the route.

CPU 21 repeats the process of selecting image data from the grid cells and adding the data to transmission list L2. For example, as indicated in "second round" in FIG. 13, CPU 21 selects image data from image data remaining in the grid cells and adds to transmission list L2.

CPU 21 repeats the above process until all image data arranged on the route is selected. For example, as indicated in "N-th round" in FIG. 13, CPU 21 repeats the process of adding image data to transmission list L2 until all image data on the route is selected.

By the above processing, image data of transmission list L2 in "Nth round" is arranged in an order different from the order of image data in target list L1 (image data arranged in the captured order).

After generating transmission list L2, CPU 21 uploads image data of transmission list L2 to server 13. CPU 21 uploads image data from the head of transmission list L2 to server 13.

Thus, for example, server 13 can generate a map based on the widely dispersed still images when the communication between OBU 11 and RSUs 12a and 12b is disconnected during uploading transmission list L2, or even when the still images are captured in a manner biased to a certain area.

Figure 14:
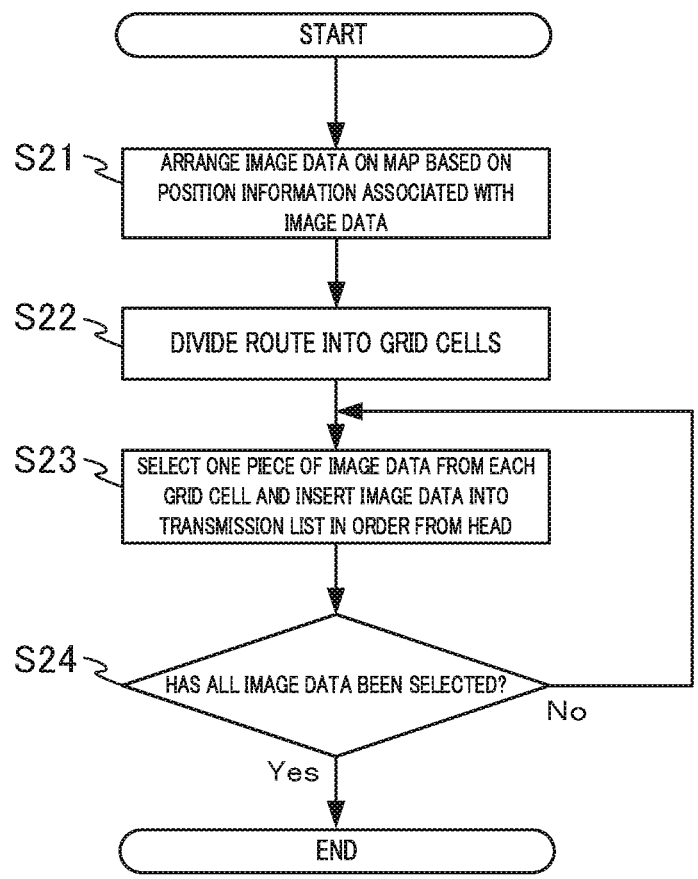
FIG. 14 is a flowchart of an exemplary rearrangement process of image data.

FIG. 14 is a flowchart of an exemplary rearrangement process of image data. The process of the flowchart in FIG. 14 corresponds to the process of S6 in FIG. 8.

CPU 21 arranges image data on the route based on the position information associated with the image data (S21).

CPU 21 divides the route into predetermined-sized grid cells (S22).

CPU 21 selects one piece of image data from each grid cell divided in S22, and inserts the selected pieces of image data into a transmission list in order from the head of the transmission list (S23).

CPU 21 determines whether all image data arranged on the route has been selected (S24). That is, CPU 21 determines whether all image data arranged on the route has been added to the transmission list.

When all image data arranged on the route has been selected ("YES" in S24), CPU 21 finishes the rearrangement process of image data. Note that, after finishing the rearrangement process of image data, CPU 21 uploads image data to server 13 in order from the head of the transmission list.

On the other hand, when not all image data arranged on the route has been selected ("No" in S24), CPU 21 shifts the processing to S23. That is, CPU 21 shifts the processing from the selection process of image data in the k-th round (k=1, 2, ..., N−1) to the selection process of image data in the k+1-th round.

As described above, CPU 21 arranges image data on the route based on the position information, divides the route into grid cells, selects the grid cells one by one according to a predetermined rule, selects image data from the selected grid cell, and adds the selected data in order from the head of the transmission list. Communication unit 23 transmits image data by radio to an RSU in order from the head of the transmission list. Thus, server 13 can generate a map based on the widely dispersed still images when the still images are captured in a biased certain area and the communication between OBU 11 and RSUs 12a and 12b is disconnected during uploading transmission list L2. Note that a plurality of images may be selected in each grid cell.
(Variation 1)

In the above description, a size of the grid cells is constant in each round of the selection process of image data, but the size of the grid cells is not limited thereto. In the selection of image data, CPU 21 may make the size of the grid cells smaller as the selection process of image data progresses to the selection progress of image data in the first round, the selection process of image data in the second round, . . . , and the selection process of image data in the N-th round.
(Variation 2)
In the above description, CPU 21 selects the grid cells for selecting image data in order from smaller to larger in the route, but the selection is not limited thereto. CPU 21 may randomly select grid cells.
(Variation 3)
CPU 21 may calculate a route from the position information (e.g., latitude and longitude) associated with image data. In addition, CPU 21 may obtain a route from a travel distance meter mounted on vehicle V1.

Embodiment 3

In Embodiment 3, CPU 21 of OBU 11 rearranges image data arranged in the captured order using a downsampling algorithm based on the position information associated with image data. In the following, portions different from those of Embodiment 1 will be described.

Figure 15:
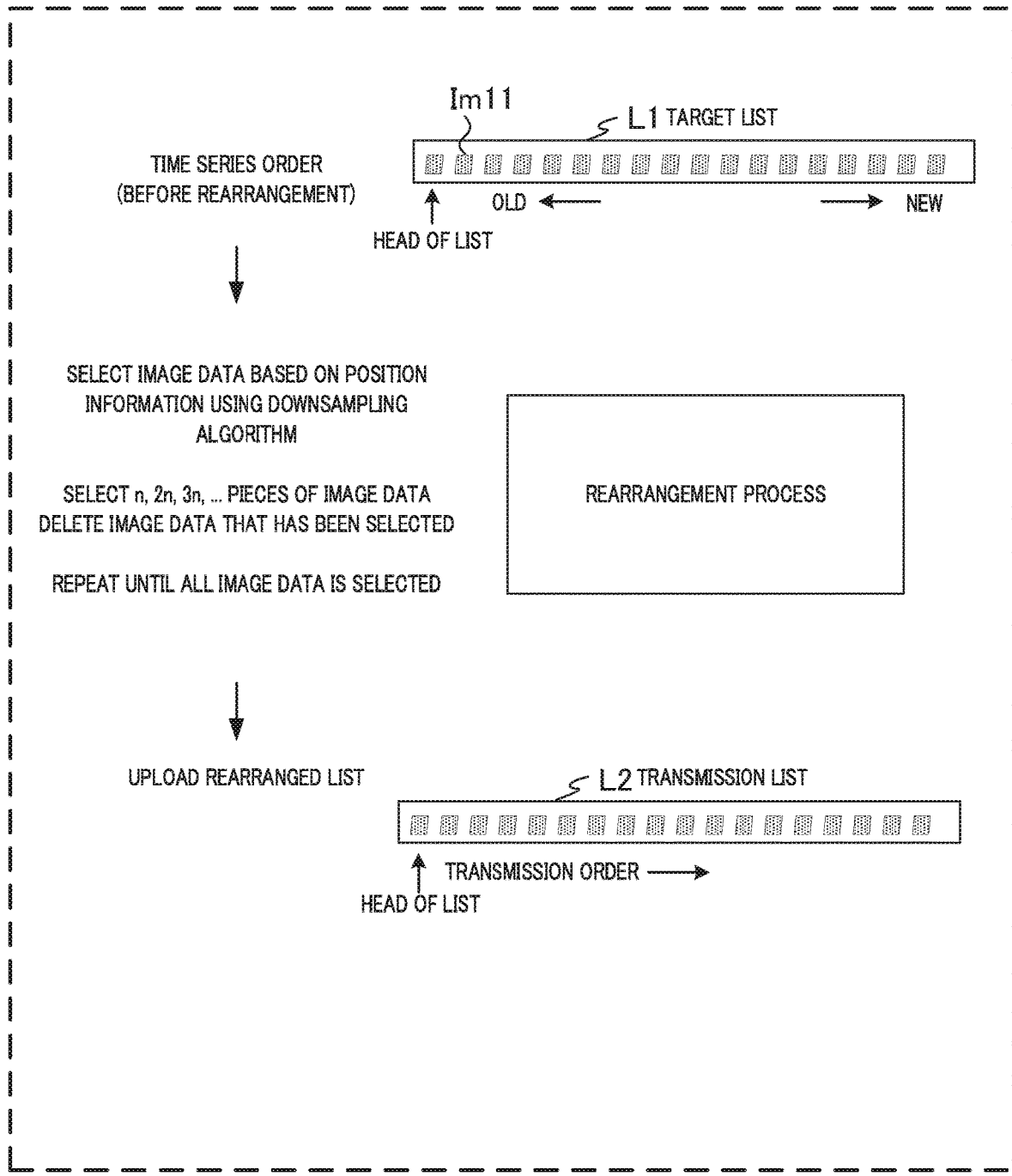
FIG. 15 is a diagram illustrating an example of rearranging image data according to Embodiment 3.

FIG. 15 is a diagram illustrating an example of rearranging image data according to Embodiment 3. Elements that are the same as those in 9A and 9B are denoted by the same reference numerals in FIG. 15.

FIG. 15 illustrates target list L1 described in S5 in FIG. 8. Still images (image data) are arranged in the captured order.

After generating target list L1, CPU 21 rearranges image data of target list L1 based on the position information associated with the image data using a downsampling algorithm.

For example, CPU 21 selects n, 2n, 3n, . . . pieces of image data from target list L1 based on the position information associated with the image data. CPU 21 adds the selected image data in order from the head of transmission list L2.

The term "n" is set to the minimum number of uploadable data pieces. CPU 21 deletes the selected image data from target list L1 so as not to select duplicate image data from target list L1. CPU 21 repeats the above process until all image data is selected from target list L1. Largest Triangle Three Buckets (LTTB) may be used as a downsampling algorithm, for example.

Figure 16:
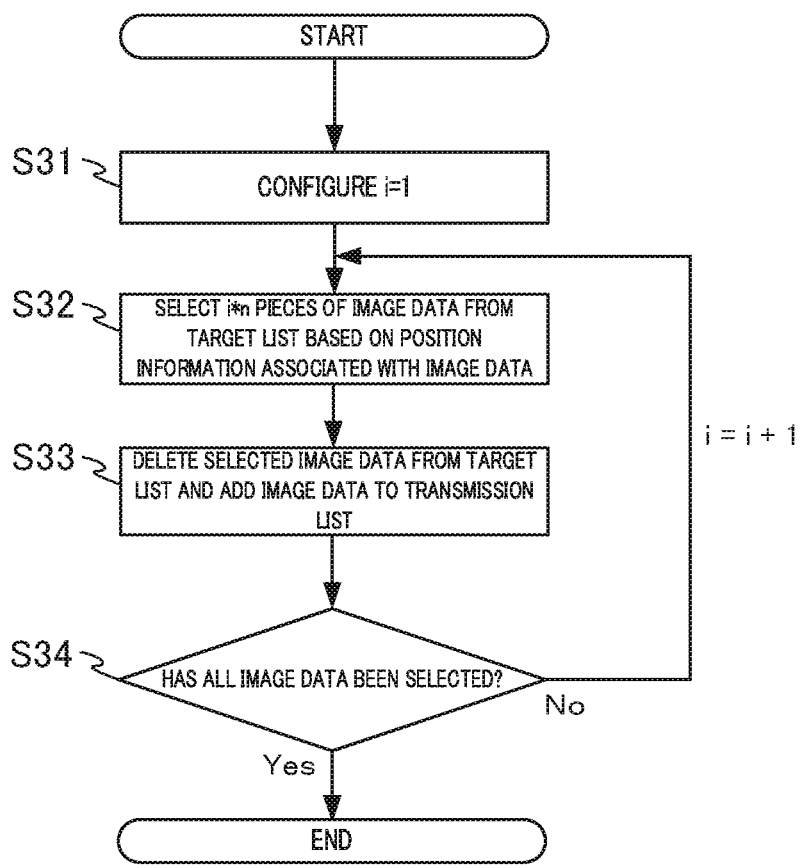
FIG. 16 is a flowchart of an exemplary rearrangement process of image data.

FIG. 16 is a flowchart of an exemplary rearrangement process of image data. The process of the flowchart in FIG. 16 corresponds to the process of S6 in FIG. 8.

CPU 21 configures 1 to variable i (S31).

CPU 21 selects i*n pieces of image data from a target list based on the position information associated with the image data.

CPU 21 deletes image data selected in S32 from the target list, and adds the image data selected in S32 to a transmission list (S33).

CPU 21 determines whether all image data has been selected from the target list (S34). When all image data in the target list has been selected ("YES" in S34), CPU 21 finishes the rearrangement process of image data. Note that, after finishing the rearrangement process of image data, CPU 21 uploads image data to server 13 in order from the head of the transmission list.

On the other hand, when not all image data in the target list has been selected ("No" in S34), CPU 21 adds 1 to variable i and shifts the processing to S32. That is, CPU 21 selects the next image data from the target list L1.

As described above, CPU11 rearranges image data arranged in the captured order using a downsampling algorithm based on the position information. This allows server 13 to generate a wide-area map when the communication between OBU 11 and RSUs 12a and 12b is disconnected during uploading transmission list.

In the above-described embodiments, the term "unit" used for the name of a component may be replaced with another term such as "circuitry", "assembly", "device", "unit", or "module".

The description has been given of embodiments with reference to the drawings, but the present disclosure is not limited to the examples. It is apparent that variations or modifications in the category described in the claims may be conceived of by a person skilled in the art. It is to be understood that such variations or modifications fall within the technical scope of the present disclosure. In addition, component elements in the embodiment may be optionally combined without departure from the spirit of the present disclosure.

The present disclosure can be realized by software, hardware, or software in cooperation with hardware. Each functional block used in the description of the each embodiment described above can be partly or entirely realized by an LSI such as an integrated circuit, and each process described in the embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

The technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication unit. The communication unit may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication unit include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication unit is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication unit may comprise a device such as a controller or a sensor which is coupled to a communication device performing a function of communication described in the present disclosure. For example, the communication unit may comprise a controller or a sensor that generates control signals or data signals which are used by a communication device performing a communication function of the communication unit.

The communication unit also may include an infrastructure facility, such as a base station, an access point, and any other apparatus, device or system that communicates with or controls apparatuses such as those in the above non-limiting examples.

(Summary of Present Disclosure)

A communication apparatus according to the present disclosure is a communication method to be mounted on a vehicle, and includes: a camera that captures a still image used for generating a map; a positioning circuit that positions a captured position of the still image; a control circuit that associates position information indicating the captured position with image data of the still image; and a communication circuit that establishes a radio communication with a roadside unit and transmits the image data by radio to the roadside unit, wherein the control circuit rearranges an transmission order of the image data to be transmitted by radio to the roadside unit, based on the position information.

In the communication apparatus according to the present disclosure, the control circuit rearranges the transmission order of the image data to be an order different from an captured order of the still images.

In the communication apparatus according to the present disclosure, the control circuit arranges the image data on map data based on the position information; divides the map data into cells of a grid; selects the cells of the grid one by one according to a predetermined rule and selects one or more pieces of image data in each of the selected cells of the grid; and rearranges the transmission order of the image data.

In the communication apparatus according to the present disclosure, the control circuit selects the cells of the grid in an order of sweeping in a horizontal direction.

In the communication apparatus according to the present disclosure, the control circuit selects the cells of the grid in an order of sweeping in a vertical direction.

In the communication apparatus according to the present disclosure, the control circuit selects the cells of the grid in a random order.

In the communication apparatus according to the present disclosure, the control circuit, after selecting all of the cells of the grid one by one, changes a size of the cells of the grid and selects, one by one, the cells of the grid whose size has been changed.

In the communication apparatus according to the present disclosure, the control circuit arranges the image data on a distance axis based on the position information; divides the distance axis into cells of the grid; and selects the cells of the grid one by one according to a predetermined rule, selects one or more pieces of image data in the selected cell of the grid, and rearrange the transmission order of the image data.

In the communication apparatus according to the present disclosure, the control circuit rearranges, using a downsampling algorithm, the image data arranged in a captured order, based on the position information.

A communication method for a communication apparatus according to the present disclosure is a communication method for a communication apparatus mounted on a vehicle, and includes: capturing a still image used for generating a map; positioning a captured position of the still image; associating position information indicating the captured position with image data of the still image; establishing a radio communication with a roadside unit and transmitting the image data to the roadside unit by radio; and rearranging a transmission order of the image data to be transmitted, by radio, to the roadside unit based on the position information.

The disclosure of Japanese Patent Application No. 2019-234458, filed on Dec. 25, 2019, including the specification, drawings and abstract, is incorporated herein by reference in its entirety.

INDUSTRIAL APPLICABILITY

The present disclosure is useful for a communication apparatus mounted on a vehicle for capturing a still image used for generating a map.

REFERENCE SIGNS LIST

1 Communication system
11 On-board unit
12a, 12b Roadside unit
13 Server
14 Network
V1, V11 Vehicle
A1a, A1b Communication area
R1 Traveling route
Z1 Traffic signal
Im1, Im2, Im11 Image
L1 Target list
L2 Transmission list

The invention claimed is:

1. A communication apparatus to be mounted on a vehicle, the communication apparatus comprising:
   a camera that captures still images used for generating a map, the still images being captured in a first order;
   a positioning circuit that positions captured positions of the still images;
   a control circuit that associates position information indicating the captured positions with image data of the still images, arranges the image data on the map based on the position information, divides the map into cells of a grid, selects the cells of the grid one by one according to a predetermined rule, selects one or more still images in each of the selected cells of the grid, and rearranges, using the position information, a transmission order of the still images from the first order to a second order that is an order in which the one or more still images is selected; and
   a communication circuit that establishes a radio communication with a roadside unit, and transmits the still images in the transmission order by radio to the roadside unit.

2. The communication apparatus according to claim 1, wherein
   the control circuit selects the cells of the grid in an order of sweeping in a horizontal direction.

3. The communication apparatus according to claim 1, wherein the control circuit selects the cells of the grid in an order of sweeping in a vertical direction.

4. The communication apparatus according to claim 1, wherein
the control circuit selects the cells of the grid in a random order.

5. The communication apparatus according to claim 1, wherein
the control circuit, after selecting all of the cells of the grid one by one, changes a size of the cells of the grid and selects, one by one, the cells of the grid whose size has been changed.

6. The communication apparatus according to claim 1, wherein
the control circuit arranges the image data on a distance axis based on the position information;
divides the distance axis into second cells of a grid;
selects the second cells of the grid one by one according to a predetermined rule; and
selects one or more still images in the selected second cells of the grid;
rearranges, using the position information, the transmission order of the still images from the first order to a third order that is an order in which the one or more still images is selected in the selected second cells of the grid.

7. The communication apparatus according to claim 1, wherein
the control circuit rearranges the transmission order of the still images using a downsampling algorithm.

8. The communication apparatus according to claim 1, wherein the first order is a time series order.

9. A communication method for a communication apparatus to be mounted on a vehicle, the communication method comprising:
capturing still images used for generating a map, the still images being captured in a first order;
positioning captured positions of the still images;
associating position information indicating the captured positions with image data of the still images;
arranging the image data on the map based on the position information;
dividing the map into cells of a grid;
selecting the cells of the grid one by one according to a predetermined rule;
selecting one or more still images in each of the selected cells of the grid;
rearranging, using the position information, a transmission order of the still images from the first order to a second order that is an order in which the one or more still images is selected; and
establishing a radio communication with a roadside unit and transmitting the still images in the transmission order to the roadside unit by radio.

10. A communication apparatus to be mounted on a vehicle, the communication apparatus comprising:
a camera that captures a still image used for generating a map;
a positioning circuit that positions a captured position of the still image;
a control circuit that associates position information indicating the captured position with image data of the still image; and
a communication circuit that establishes a radio communication with a roadside unit and transmits the image data by radio to the roadside unit, wherein
the control circuit arranges the image data on map data based on the position information, divides the map data into cells of a grid, selects the cells of the grid one by one according to a predetermined rule, selects one or more pieces of image data in each of the selected cells of the grid, and rearranges a transmission order of the image data to be transmitted by radio to the roadside unit based on the selected one or more pieces of image data.

11. A communication apparatus to be mounted on a vehicle, the communication apparatus comprising:
a camera that captures a still image used for generating a map;
a positioning circuit that positions a captured position of the still image;
a control circuit that associates position information indicating the captured position with image data of the still image; and
a communication circuit that establishes a radio communication with a roadside unit and transmits the image data by radio to the roadside unit, wherein
the control circuit arranges the image data on a distance axis based on the position information, divides the distance axis into cells of a grid, selects the cells of the grid one by one according to a predetermined rule, selects one or more pieces of image data in the selected cell of the grid, and rearranges a transmission order of the image data to be transmitted by radio to the roadside unit based on the selected one or more pieces of image data.

* * * * *